(12) United States Patent
Dhanapal et al.

(10) Patent No.: US 11,765,574 B2
(45) Date of Patent: Sep. 19, 2023

(54) ADVERTISING USER EQUIPMENT CAPABILITY

(71) Applicant: Apple Inc., Cupertino, CA (US)

(72) Inventors: Muthukumaran Dhanapal, Sunnyvale, CA (US); Li Su, San Jose, CA (US); Alosious Pradeep Prabhakar, Singapore (SG); Adesh Kumar, San Jose, CA (US); Jathurshun Sivaloganathan, Singapore (SG); Lakshmi N. Kavuri, Cupertino, CA (US); Rangakrishna Nallandigal, Santa Clara, CA (US); Shawn Pereira, Singapore (SG); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/862,778

(22) Filed: Apr. 30, 2020

(65) Prior Publication Data
US 2020/0351643 A1 Nov. 5, 2020

Related U.S. Application Data

(60) Provisional application No. 62/902,738, filed on Sep. 19, 2019, provisional application No. 62/842,174, filed on May 2, 2019.

(51) Int. Cl.
*H04W 72/12* (2023.01)
*H04W 56/00* (2009.01)
(Continued)

(52) U.S. Cl.
CPC ............ *H04W 8/24* (2013.01); *H04B 7/0413* (2013.01); *H04W 72/0453* (2013.01); *H04W 72/56* (2023.01); *H04W 76/15* (2018.02)

(58) Field of Classification Search
CPC ......... H04W 72/0453; H04W 36/0069; H04W 72/10; H04W 48/16; H04W 76/15; H04L 5/001; H04B 7/0413; H04B 7/0628
(Continued)

(56) References Cited

U.S. PATENT DOCUMENTS

| 2012/0184281 | A1 | 7/2012 | Kim et al. |
| 2015/0215793 | A1* | 7/2015 | Siomina ............... G01S 5/0205 |
| | | | 455/456.1 |

(Continued)

FOREIGN PATENT DOCUMENTS

| CN | 103329458 | 9/2013 |
| CN | 107409320 | 11/2017 |

(Continued)

OTHER PUBLICATIONS

Qualcomm Incorporated, "Ambiguity in UE supported and reported DL and UL categories", 3GPP TSG RAN WG5, R5-192712, Mar. 2019, 2 sheets.

(Continued)

*Primary Examiner* — Wutchung Chu
*Assistant Examiner* — Jason A Harley
(74) *Attorney, Agent, or Firm* — Fay Kaplun & Marcin, LLP

(57) ABSTRACT

A method, device, computer readable storage medium and integrated circuit for providing user equipment (UE) capability information to a network. The method includes receiving a request from a network for radio access capabilities of the UE, determining a first plurality of band combinations that the UE is capable of utilizing for communications with the network, determining a number of band combinations that are to be included with a message generated in response to the request, ordering the plurality of band combinations into a prioritized order of band combinations based on at (Continued)

least one priority factor, generating the message that includes the radio access capabilities, wherein the message includes a second plurality of band combinations that are based on the prioritized order and the number of band combinations that are to be included with a message and transmitting the message to the network.

20 Claims, 9 Drawing Sheets

(51) Int. Cl.
    *H04W 8/22*     (2009.01)
    *H04W 28/02*     (2009.01)
    *H04J 3/06*     (2006.01)
    *H04B 1/00*     (2006.01)
    *H04W 4/00*     (2018.01)
    *H04W 72/04*     (2023.01)
    *H04W 8/24*     (2009.01)
    *H04W 24/04*     (2009.01)
    *H04W 72/0453*     (2023.01)
    *H04B 7/0413*     (2017.01)
    *H04W 76/15*     (2018.01)
    *H04W 72/56*     (2023.01)

(58) Field of Classification Search
    USPC .......................................................... 370/254
    See application file for complete search history.

(56) References Cited

U.S. PATENT DOCUMENTS

| | | | |
|---|---|---|---|
| 2015/0327269 A1* | 11/2015 | Kim | H04W 74/004 370/329 |
| 2018/0070250 A1 | 3/2018 | Venkataraman et al. | |
| 2018/0131478 A1* | 5/2018 | Song | H04B 7/04 |
| 2018/0198502 A1* | 7/2018 | Kim | H04B 7/063 |
| 2018/0206113 A1* | 7/2018 | He | H04W 8/24 |
| 2019/0215714 A1* | 7/2019 | Wu | H04W 24/02 |
| 2019/0246286 A1* | 8/2019 | Henttonen | H04W 8/24 |
| 2019/0268911 A1* | 8/2019 | Kumar | H04B 7/0417 |
| 2019/0320396 A1* | 10/2019 | Bagheri | H04W 72/1289 |
| 2019/0373523 A1* | 12/2019 | Panchal | H04L 5/0098 |
| 2020/0136703 A1 | 4/2020 | Li et al. | |
| 2020/0296677 A1* | 9/2020 | Hosseini | H04L 5/001 |
| 2020/0328839 A1* | 10/2020 | Zhang | H04L 27/34 |
| 2020/0329437 A1* | 10/2020 | MolavianJazi | H04W 52/146 |
| 2020/0329523 A1* | 10/2020 | Yi | H04W 72/0453 |

FOREIGN PATENT DOCUMENTS

| | | |
|---|---|---|
| CN | 107801182 | 3/2018 |
| CN | 108632811 | 10/2018 |
| CN | 109302702 | 2/2019 |
| WO | 2018/085723 | 5/2018 |
| WO | 2019/013973 | 1/2019 |

OTHER PUBLICATIONS

Ericsson, "Clarification on filters used to generate FeatureSets", 3GPP TSG RAN WG2, R2-1905463, Apr. 2019, 6 sheets.

\* cited by examiner

ADVERTISING USER EQUIPMENT CAPABILITY

PRIORITY CLAIM/INCORPORATION BY REFERENCE

This application claims priority to U.S. Provisional Application Ser. No. 62/842,174 filed on May 2, 2019 and entitled "Advertising User Equipment Capability" and U.S. Provisional Application Ser. No. 62/902,738 filed on Sep. 19, 2019 and entitled "Advertising User Equipment Capability," both of which are incorporated herein by reference.

BACKGROUND

A user equipment (UE) may establish a connection to at least one of a plurality of different networks or types of networks. When establishing the network connection, the UE may provide capability information to the network that indicates the radio access capabilities of the UE. The capability information may enable the network to provide the UE with relevant services. For example, the UE may advertise a plurality of band combinations that may be used for dual-connectivity (DC) and/or carrier aggregation (CA). Subsequently, to provide the UE with DC and/or CA, the network may configure the UE with a plurality of component carriers (CCs) to facilitate communication between the network and the UE over one of the advertised band combinations.

For a variety of different reasons, the UE may be limited in the number of band combinations that can be advertised. Thus, in certain scenarios, the UE may identify a plurality of band combinations that may be used for DC and/or CA but may only advertise a subset of the identified band combinations. When limiting the number of advertised band combinations, a band combination that supports a particular capability may go unadvertised. Accordingly, under conventional circumstances, the network may not configure the UE with the radio resources needed to utilize a particular capability because a band combination that supports the capability went unadvertised.

SUMMARY

Some exemplary embodiments include a method performed by a user equipment (UE). The method includes receiving a request from a network for radio access capabilities of the UE, determining a first plurality of band combinations that the UE is capable of utilizing for communications with the network, determining a number of band combinations that are to be included with a message generated in response to the request, ordering the plurality of band combinations into a prioritized order of band combinations based on at least one priority factor, generating the message that includes the radio access capabilities, wherein the message includes a second plurality of band combinations that are based on the prioritized order and the number of band combinations that are to be included with a message and transmitting the message to the network.

Other exemplary embodiments include a user equipment (UE) that has a transceiver and a processor. The transceiver is configured to connect to a network. The processor is configured to receive a request from the network for radio access capabilities of the UE, determine a first plurality of band combinations that the UE is capable of utilizing for communications with the network, determine a number of band combinations that are to be included with a message generated in response to the request, order the plurality of band combinations into a prioritized order of band combinations based on at least one priority factor and generate the message that includes the radio access capabilities, wherein the message includes a second plurality of band combinations that are based on the prioritized order and the number of band combinations that are to be included with a message. The transceiver is further configured to transmit the message to the network.

Still further exemplary embodiments include a method performed by a user equipment (UE). The method includes receiving a request from a network for radio access capabilities of the UE, determining a first plurality of band combinations that the UE is capable of utilizing for communications with the network based on a radio frequency band list, ordering the plurality of band combinations into a prioritized order of band combinations based on the radio frequency band list, generating a message that includes the radio access capabilities, wherein the message includes the prioritized order of band combinations and transmitting the message to the network.

DETAILED DESCRIPTION

Figure 1:
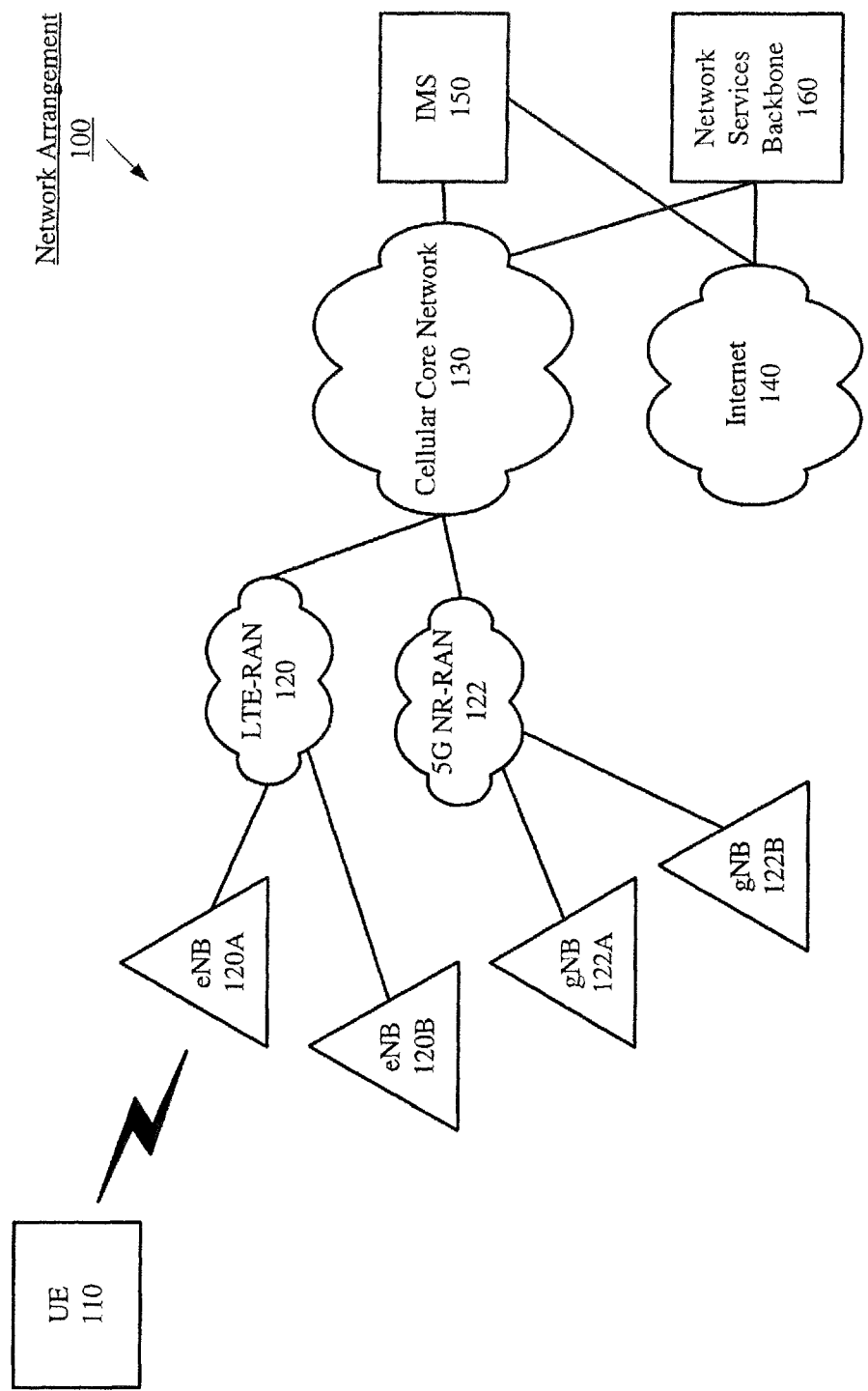
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method for prioritizing band combinations that may be advertised by a user equipment (UE).

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio (NR) radio access technology (RAT) and Long-Term Evolution (LTE) RAT. The network may support carrier aggregation (CA) and/or LTE-NR dual-connectivity (ENDC). CA and ENDC will be described in detail below. However, both CA and ENDC relate to the UE being configured with a plurality of component carriers (CCs). Each CC may represent a channel that facilitates communication between the UE and the network over a particular frequency band. A plurality of CCs may correspond to the same frequency band, each CC may correspond to a different band or a combination thereof. Further, each CC has a particular bandwidth, the more CCs the UE is configured with the more bandwidth that is available for communications with the network.

Throughout this description, the term band combination may generally refer to a combination of frequency bands that the UE has determined may be utilized for a plurality of CCs. Thus, a band combination may relate to CA and/or ENDC. As will be explained below, the UE may be triggered to provide the network with capability information that relates to the radio access capabilities of the UE. The capability information may include an indication of a plurality of band combinations that the UE determined may be utilized for communications with the network (e.g., CA, ENDC, etc.). The capability information may enable the network to provide the UE with relevant services. Thus, by signaling a plurality of band combinations to the network, the UE may be subsequently provided with the radio resources to utilize CA and/or ENDC over one of the advertised band combinations.

The UE may be configured to access 5G NR services when operating in non-standalone (NSA) mode for 5G or standalone (SA) mode for 5G. In NSA mode, the UE may establish a connection with both 5G NR RAT and LTE RAT (e.g., ENDC). Throughout this description, ENDC may generally refer to a UE that is configured to transmit and receive on a plurality of CCs corresponding to cells associated different RATs. For example, when in NSA mode for 5G, the UE may achieve ENDC via a master cell group (MCG) corresponding to LTE and a secondary cell group (SCG) corresponding to 5G NR or vice versa. Each cell group may include at least one cell for a corresponding RAT. In one exemplary scenario of ENDC, from a protocol stack perspective, the UE may have a control plane and a user plane with the 5G NR network while also having a control plane and a user plane with the LTE network. In another exemplary scenario of ENDC, the UE may have a control plane with the LTE network and a user plane with the 5G NR network or vice versa. Thus, when operating in NSA mode for 5G, the UE may have a simultaneous connection to 5G NR and LTE (e.g., ENDC). However, it should be noted, that when operating in NSA mode for 5G, the UE may transition between instances of being connected on one RAT (e.g., 5G NR, LTE, Legacy, etc.) to being connected on a multiple RATs (e.g., ENDC).

The following examples provide a general overview of the type of network configuration that may facilitate ENDC functionality. In a first exemplary configuration, the network connection may use the evolved packet core (EPC) of LTE and the UE may communicate with at least one LTE cell serving as the master cell group (MCG) and at least one NR cell serving as a secondary cell group (SCG). In a second exemplary configuration, the network connection may use the 5G core network (5GC) and the UE may communicate with at least one NR cell serving as the MCG and at least one LTE cell serving as the SCG. In a third exemplary NSA configuration, the network connection may use the 5GC and the UE may communicate with at least one LTE cell serving as the MCG and at least one NR cell serving as the SCG. However, the exemplary embodiments are not limited to the examples provided above related to either the protocol stack or the network configuration. The exemplary embodiments apply to ENDC functionality being achieved in any appropriate manner.

In SA mode for 5G, the UE may connect to one RAT at a particular time. Accordingly, the network connection may transition between different RATs (e.g., 5G NR, LTE, Legacy, etc.). For example, at a first time, the network connection may use the 5GC and the UE may communicate with the network via at least one NR cell. During operation, the UE may experience a handover from the 5G to LTE, where the network connection may then use the EPC and the UE may communicate with network via at least one LTE cell. However, any reference to a particular type of RAT, core network, cell or mode of operation is merely provided for illustrative purposes. The exemplary embodiments may apply to the UE that is configured to advertise band combinations when connected to any type of network and configured to operate in any appropriate type of operating mode.

As mentioned above, the UE may also be configured with carrier aggregation (CA) functionality. CA may include a primary component carrier (PCC) and at least one secondary component carrier (SCC) that correspond to the same RAT being used to facilitate communication with the network. The PCC may be used, in part, for control information such as scheduling requests, uplink grants, downlink grants, etc. CA functionality enables the PCC and at least one SCC to combine bandwidths to exchange data with the UE. Thus, with CA, the PCC may provide a first portion of a total bandwidth for data to be exchanged while the SCC may provide a second portion of the total bandwidth. The combination of a PCC and a single SCC may be characterized as a CC combination that includes two carriers. To further increase the total available bandwidth for data to be exchanged with the UE, additional SCCs may be incorporated. For example, with CA for LTE, there may be CC combinations that include, but are not limited to, two carriers, four carriers, five carriers, eight carriers, ten carriers, thirty-two carriers, etc. With CA for 5G NR there may be CC combinations that include, but are not limited to, two carriers, five carriers, ten carriers, twelve carriers, sixteen carriers, twenty carriers, twenty-five carriers, thirty-two carriers, sixty-four carriers, etc.

Thus, in SA mode for 5G, the UE may advertise band combinations corresponding to 5G NR for CA functionality. It should be noted that when in NSA mode, the UE may also be configured with ENDC and CA simultaneously. That is, the MCG may provide a plurality of aggregated CCs corresponding to a first RAT and the SCG may provide a plurality of aggregated CCs corresponding to the second RAT.

To provide an example of when a UE operating in NSA mode for 5G may advertise a band combination, consider the following exemplary scenario. The UE is operating in NSA mode for 5G, currently camped on an LTE cell and has been triggered to provide capability information to the network. Since, NSA mode relates to the 5G NR RAT and the LTE RAT, the capability information may include band combinations that relate to only the LTE RAT, only the 5G NR RAT or both the LTE RAT and the 5G NR RAT. The band combinations that relate to only the LTE RAT may be used for CA on LTE, the band combinations for only the 5G NR RAT may be used for CA on 5G NR and the band combinations that relate both the LTE RAT and the 5G NR RAT may be used for ENDC. Subsequently, the network may configure the UE with ENDC and/or CA. In this example, the network enables ENDC by configuring the UE with a plurality of CCs corresponding to both the 5G NR RAT and the LTE RAT that use one of the band combinations included in the capability information.

To provide an example of when a UE operating in SA mode may advertise a band combination, consider the following exemplary scenario. The UE is operating in SA mode, currently camped on an 5G NR cell and has been triggered to provide capability information to the network. Since SA mode relates to the 5G NR RAT, the capability information may include band combinations that relate to 5G NR. Subsequently, the network may enable CA by configuring the UE with a plurality of CCs corresponding to 5G NR. In this example, the network enables CA by configuring the UE with a plurality of CCs that use one of the band combinations that was included in the capability information. However, the above examples related to providing capability information to the network in NSA mode and SA mode are merely provided for illustrative purposes. The exemplary embodiments apply to advertising band combinations in either NSA mode or SA mode in any appropriate manner.

For a variety of different reasons, the UE be may limited in the number of band combinations that can be advertised to the network. For example, 3$^{rd}$ Generation Partnership Project (3GPP) standard requirements may include a maximum number of band combinations that may be advertised (e.g., 128, 256, etc.). Similarly, 3GPP standard requirements may include a limit on the size of the message or the portion of the message that is configured to include a plurality of band combinations. To comply with the size limitations, the UE may reduce the size of the message by limiting the number of band combinations that are to be advertised.

Additionally, in one exemplary scenario, the network may signal the UE to further limit the number of band combinations, the size of the message that is to include the band combinations and/or the size of the portion of the message that is to include the band combinations. The network may request that the UE impose limits that are below the standard's limits for any of a variety of different factors including, but not limited to, hardware, software and/or firmware performance limitations of a network entity, improving the performance of the network, improving the performance of UEs currently camped on a particular cell, improving the performance of the UE sending the capability information, etc. In another exemplary scenario, the UE may further limit the number of band combinations, the size of the message that is to include the band combinations and/or the size of the portion of the message that is to include the band combinations for power optimization. The UE may impose limits that are below the standard's limits for power saving and/or network connection purposes. The above examples are merely provided for illustrative purposes, the exemplary embodiments apply to a UE that may limit the number of band combinations that are advertised to the network for any appropriate reason.

Accordingly, for any of a variety of different reasons, the UE may identify a plurality of band combinations that may be used for CA and/or ENDC but may only advertise a subset of the identified plurality of band combinations. Under conventional circumstances, when limiting the number of band combinations that are advertised to the network, a band combination that supports a particular feature or capability may go unadvertised. For example, band combinations that support multiple input multiple output (MIMO) communications in a particular configuration and/or a particular modulation and coding scheme (MCS) may go unadvertised. Thus, despite a band combination supporting a capability or feature that may improve performance of the UE (e.g., MIMO, a type of MCS, etc.) the band combination may go unadvertised. As a result, the network may configure the UE with CA and/or ENDC over a band combination that does not support a particular feature (e.g., MIMO, a type of MCS, etc.) that would improve the user experience because band combinations that support these capabilities or features went unadvertised.

The exemplary embodiments relate to a UE that is configured to prioritize the identified band combinations. Accordingly, when advertising the band combinations to the network, the band combinations associated with the highest priority are included in the capability information and the band combinations with lower priority may go unadvertised. Further, from the perspective of the network, the prioritized band combinations may be utilized, at least in part, when selecting a band combination for the UE. Accordingly, the exemplary embodiments relate to using various priority factors to generate a prioritized set of band combinations.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are an LTE radio access network (LTE-RAN) 120 and a 5G New Radio (NR) radio access network (5G NR-RAN) 122. However, it should be understood that the UE 110 may also communicate with other types of networks (e.g. legacy cellular network, WLAN, etc.) and the UE 110 may also communicate with networks over a wired connection. With regard to the exemplary embodiments, the UE 110 may establish a connection with the 5G NR-RAN 122 and/or the LTE-RAN 120. Therefore, the UE 110 may have both an LTE chipset to communicate with the LTE-RAN 120 and a 5G NR chipset to communication with the 5G NR-RAN 122.

The LTE-RAN 120 and the 5G NR-RAN 122 may be portions of cellular networks that may be deployed by cellular providers (e.g., Verizon, AT&T, Sprint, T-Mobile, etc.). These networks 120 and 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The use of a separate LTE-RAN 120 and a 5G NR-RAN 122 is merely provided for illustrative purposes. An actual network arrangement may include a radio access network that includes architecture that is capable of providing both 5G NR RAT and LTE RAT services. For example, a nextgenerations radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC). Thus, in one exemplary configuration, the UE 110 may achieve ENDC by establishing a connection to at least one cell corresponding to the LTE-RAN 120 and at least one cell corresponding to the 5G NR-RAN 122. In another exemplary configuration, the UE 110 may achieve ENDC by establishing a connection to at least two cells corresponding to the NG-RAN or other type of similar RAN. Accordingly, the example of a separate LTE-RAN 120 and a 5G NR-RAN 122 is merely provided for illustrative purposes.

Returning to the exemplary network arrangement 100, the UE 110 may connect to the LTE-RAN 120 via at least one of the evolved Node B (eNB) 120A or the eNB 120B. The UE 110 may connect to the 5G NR-RAN 122 via at least one of the next generation Node B (gNB) 122A or gNB 122B. Those skilled in the art will understand that any association procedure may be performed for the UE 110 to connect to the LTE-RAN 120 or the 5G NR-RAN 122. For example, as discussed above, the 5G NR-RAN 122 may be associated with a particular cellular provider where the UE 110 and/or the user thereof has a contract and credential information (e.g., stored on a SIM card). Upon detecting the presence of the 5G NR-RAN 122, the UE 110 may transmit the corresponding credential information to associate with the 5G NR-RAN 122. More specifically, the UE 110 may associate with a specific cell (e.g., the gNB 122A of the 5g NR-RAN 122). Similarly, for access to LTE services, the UE 110 may associate with eNB 120A. However, as mentioned above, the use of the LTE-RAN 120 and the 5G NR-RAN 122 is for illustrative purposes and any appropriate type of RAN may be used.

In addition to the RANs 120 and 122, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
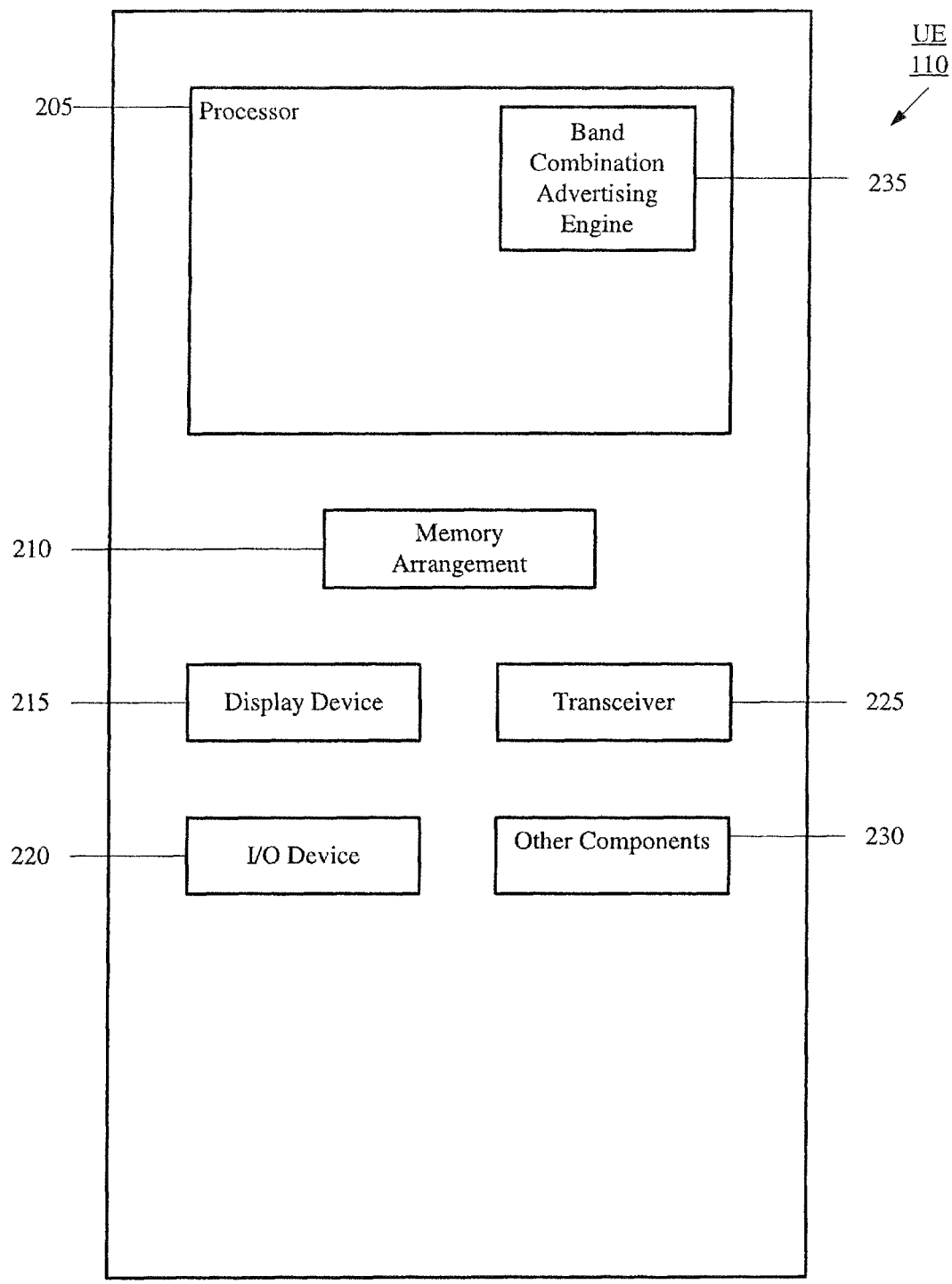
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a band combination advertising engine 235. The band combination advertising engine 235 may receive a plurality of band combinations that the UE 110 identifies may be utilized for the network connection. Subsequently, the band combination advertising engine 235 may prioritize particular band combinations based on various factors. The band combinations are then advertised based on their corresponding priority.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122 etc. Accordingly, the transceiver 225 may operate on a variety of different frequencies or channels (e.g., set of consecutive frequencies).

When connected to a network (e.g., LTE-RAN 120, 5G NR-RAN 122), the UE 110 may be configured to be in one of a plurality of different operating states. One operating state may be characterized as RRC idle state and another operating state may be characterized as RRC connected state. RRC refers to the radio resource control (RRC) protocols. Those skilled in the art will understand that when the UE 110 is in RRC connected state, the UE 110 and the network may be configured to exchange information and/or data. The exchange of information and/or data may allow the UE 110 to perform functionalities available via the network connection. Further, those skilled in the art will understand that when the UE 110 is connected to the network and in RRC idle state the UE 110 is generally not exchanging data with the network and radio resources are not being assigned to the UE 110 within the network. However, when the UE 110 is in RRC idle state, the UE 110 may monitor for information and/or data transmitted by the network.

The exemplary embodiments are not limited to RRC connected state and RRC idle state. Those skilled in the art will understand that the RRC idle and connected states are terms associated with an LTE network. Throughout this description these terms are being used generally to describe states the UE 110 may be in when connected to any network and that exhibit the characteristics described above for the RRC idle and RRC connected states. For example, when the UE 110 is operating within the 5G NR-RAN 122, the UE 110 may be configured to be in an RRC inactive state. In RRC inactive mode, the UE 110 maintains an RRC connection while minimizing signaling and power consumption. As described above, reference to any particular operating state is merely provided for illustrative purposes, the exemplary embodiments may apply to any suitable operating state for the UE 110.

When the UE 110 is camped on a first cell of a first RAT in an RRC idle state, the UE 110 may not be able to exchange data with the network. To exchange data with the network the UE 110 may transition from the RRC idle state to the RRC connected state. For example, while in RRC idle state the UE 110 may listen for information such as but not limited to, primary synchronization signals (PSS) and secondary synchronization signals (SSS), Master Information Block (MIB), broadcast messages, System Information Block (SIB), paging messages etc. In response, the UE 110 may issue a request to the network that indicates that the UE 110 wants to be moved to the RRC connected state. A successful transition from the RRC idle state to the RRC connected state may include the exchange of messages between the UE 110 and the first cell of the first network. In the RRC connected state, a network context may be established between the first cell of the first network and the UE 110. Thus, the UE 110 may be assigned radio resources and the UE 110 may be able to exchange data with the network. Transitioning from an RRC connected state to an RRC idle state may be referred to as RRC connection release and transitioning from an RRC idle state to an RRC connected state may be referred to as RRC connection setup or RRC connection reestablishment. However, reference to RRC connection setup, RRC connection reestablishment and RRC connection release is merely provided for illustrative purposes. Other networks may refer to similar operations by different names.

Figure 3:
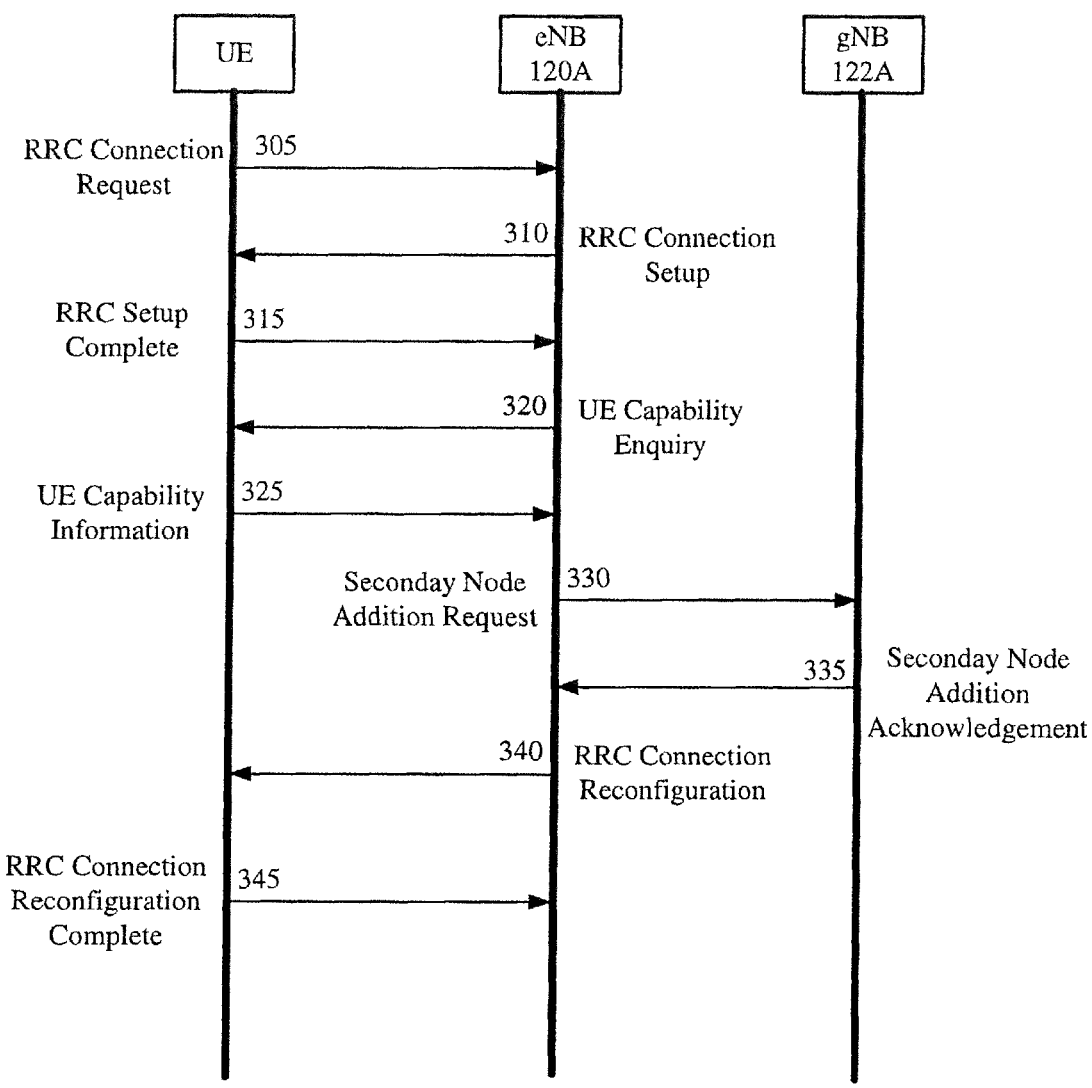
FIG. 3 shows a signaling diagram that relates to configuring the UE with a network connection that includes multiple RATS according to various exemplary embodiments.
Figure 4:
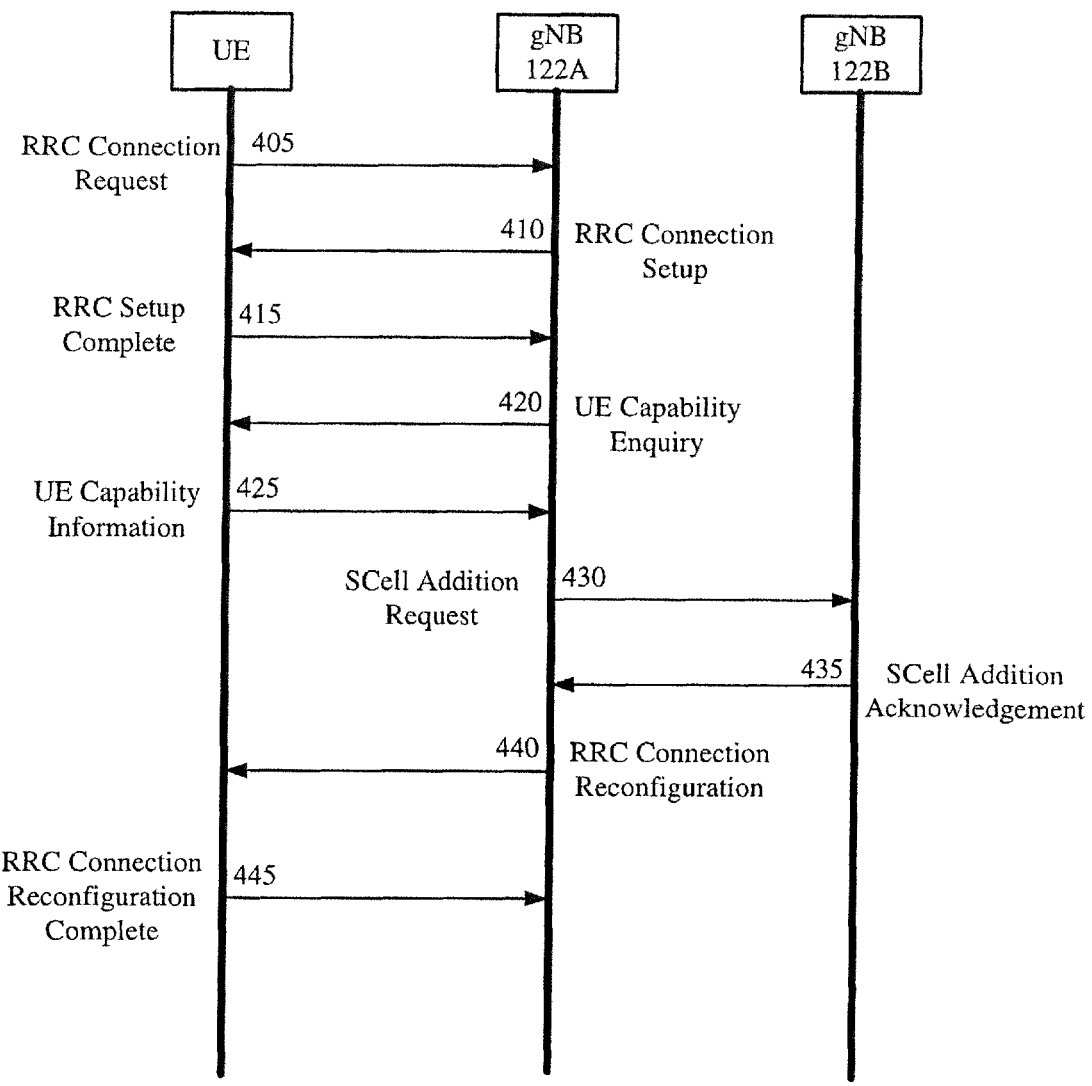
FIG. 4 shows a signaling diagram that relates to configuring the UE with a network connection that includes multiple cells from the same RAT according to various exemplary embodiments.

As mentioned above, during operation, the UE 110 may be configured with ENDC and/or CA, both of which relate to a plurality of CCs being used to facilitate communications between the network and the UE 110. To achieve ENDC and/or CA, the UE 110 may initially provide the network with UE capability information that relates to the radio access capabilities of the UE 110. The UE capability information may include a plurality of band combinations that may be used for ENDC and/or CA. The signaling diagram of FIG. 3 shows a general example of how the network may provide the UE 110 with ENDC and the signaling diagram of FIG. 4 shows a general example of how the network may provide the UE 110 with CA. However, the exemplary embodiments are not limited to the signaling diagrams of FIG. 3 and FIG. 4, these signaling diagrams are only intended to illustrate a general example of the context in which the UE 110 may advertise a plurality of band combinations to the network. The exemplary embodiments apply to any scenario in which the UE 110 is triggered to advertise a plurality of band combinations to the network.

FIG. 3 shows a signaling diagram 300 that relates to configuring the UE 110 with a network connection that includes multiple RATs according to various exemplary embodiments. The signaling diagram 300 will be described with regard to the UE 110 and the network arrangement 100.

Consider the following exemplary scenario, the UE 110 is camped on the eNB 120A of the LTE-RAN 120A and is in the RRC idle state. The UE 110 is operating in NSA mode for 5G and thus, equipped with ENDC functionality.

In 305, the UE 110 transmits an RRC connection request to the eNB 120A. This request may be in accordance with the network protocol and may be how the UE 110 initiates the transition of the UE 110 from being camped on a cell in an RRC idle state to being camped on the cell in an RRC connected state.

In 310, the eNB 120A transmits an RRC connection setup message to the UE 110. Similar to the request, this message may be in accordance with the network protocol and may be how the network provides the UE with various parameters and metrics that are used to successfully establish the RRC connection with the eNB 120A.

In 315, the UE 110 transmits an RRC connection setup complete message to the eNB 120A. Like in 305 and 310, the RRC connection setup complete message may be in accordance with the network protocol. It may provide an indication to the eNB 120A that the UE 110 was able to successfully establish an RRC connection with the eNB 120A. Subsequently, various signaling may occur between the UE 110, the eNB 120A and various network entities to establish various bearers and access to the full scope of services normally available to the UE 110 via the network connection.

In 320, the eNB 120A may be triggered to transmit a UE capability enquiry message to the UE 110. This message may be in accordance with the network protocol and indicate to the UE 110 to compile and transmit a message that includes various radio access capabilities of the UE 110.

In 325, the UE 110 transmits the UE capability information to the eNB 120A. The format and contents of the message that includes UE capability information is based on the network protocol. In this exemplary scenario, since the UE 110 is operating in NSA mode for 5G, the UE 110 includes capabilities related to the LTE-RAN 120, capabilities related to the 5G-NR RAN 122 and capabilities related to ENDC. This may include a plurality of band combinations. Some of the band combinations may relate to CA for LTE-RAN 120, CA for 5G-NR 122 or ENDC.

In 330, the eNB 120A sends a secondary node addition request to the gNB 122A to serve as the secondary cell group (SCG) for the UE 110 for ENDC. The request may be sent to the gNB 122A via the communication interface between the cells and in accordance with the corresponding communication protocol. The network may trigger the eNB 120A to configure the UE 110 with ENDC due, in part, to the band combinations provided in the UE capability information. Other factors may include, but are not limited to, throughput requirements for the UE 110, signal quality corresponding to the UE 110 network connection, the network architecture (e.g., locations of gNB 122A, gNB 122B) relative to the eNB 120A, network load, etc. The secondary node addition request to the gNB 122A may include information related to aspects of the network connection, such as, but not limited to, RRC configuration, bearer configuration, UE capability information, security information, etc.

In 335, the gNB 122A sends a secondary node addition acknowledgement to the eNB 120A. This acknowledgement is also sent via the communication interface between the cells and in accordance with the corresponding communication protocol. The acknowledgement may include information related to the 5G NR connection, such as but not limited to, radio resources that may be assigned to the UE 110, radio bearers, RRC configuration messages, etc.

In 340, the eNB 120A sends an RRC connection reconfiguration message to the UE 110. The format and contents of this message is based on the corresponding network protocol. The RRC connection reconfiguration message may include information, such as but not limited to, 5G NR radio resources assigned to the UE 110, radio bearers, cell identities, timers and thresholds related to the network connection, etc.

In 345, the UE 110 sends the eNB 120A an RRC connection reconfiguration complete message. The format and contents of this message is based on the corresponding network protocol. This message indicates to the eNB 120A that the RRC connection reconfiguration has been successfully completed.

Subsequently, the UE 110 may synchronize with the gNB 122A based on information received from the eNB 120A. As mentioned above, the exemplary embodiments are not limited to providing the UE 110 with ENDC as illustrated in the signaling diagram 300. The signaling diagram is merely intended to provide a general overview of how the network may provide the UE 110 with ENDC. For example, in other exemplary embodiments, the UE 110 may initially be camped on the gNB 122A and the eNB 120A may then be added to provide ENDC. In another exemplary embodiment the UE 110 may be triggered to provide UE capability information without receiving a UE capability enquiry message. Thus, the signaling diagram 300 is merely provided for illustrative purposes.

FIG. 4 shows a signaling diagram 400 that relates to configuring the UE 110 with a network connection that includes multiple cells from the same RAT according to various exemplary embodiments. The signaling diagram 400 will be described with regard to the UE 110, the network arrangement 100 and the signaling diagram 300.

Consider the following exemplary scenario, the UE 110 is camped on the gNB 122A of the 5G NR-RAN 122A and is in the RRC idle state. The UE 110 is operating in SA mode for 5G.

The signals 405-420 between the UE 110 and the gNB 122A are similar to the signals 305-320 illustrated above in the signaling diagram 300. Since the UE 110 is operating in SA mode and the communications are between the UE 110 and the gNB 122A, there may be differences between the signals 305-320 and the signals 405-420 due to differences in the network protocol. However, generally the RRC signaling for LTE and the RRC signaling for 5G NR are similar for these types of scenarios.

In 425, the UE 110 transmits the UE capability information to the gNB 122A. The format and contents of the message that includes UE capability information is based on the network protocol. In this exemplary scenario, since the UE 110 is operating in SA mode for 5G, the UE 110 includes capabilities related to the 5G-NR RAN 122. This may include a plurality of band combinations that may relate to CA for 5G-NR RAN 122.

In CA, the PCC may be provided by the primary cell (PCell) and a SCC may be provided by a secondary cell (SCell). However, this does not require the connection to include more than one network entity. A single network entity may be capable of operating on a plurality of bands and thus, fulfilling the role of the PCell and the SCell by providing a plurality of CCs. Accordingly, reference to CA including separate gNBs is merely provided for illustrative purposes.

In 430, gNB 122A sends a SCell addition request to the gNB 122B to serve as the SCell for the UE 110 operating in CA. The request may be sent to the gNB 122B via the communication interface between the cells and in accordance with the corresponding communication protocol. The network may trigger the gNB 122A to configure the UE 110 with CA due, in part, to the band combinations provided in the UE capability information. Other factors may include, but are not limited to, throughput requirements for the UE 110, signal quality corresponding to the UE 110 network connection, the network architecture (e.g., location of the gNB 122B) relative to the gNB 122A, network load, etc. The SCell addition request to the gNB 122B may include information related to aspects of the network connection, such as, but not limited to, RRC configuration, bearer configuration, UE capability information, security information, etc.

In 435, the gNB 122B sends a SCell addition acknowledgement to the gNB 122A. This acknowledgement may also be sent via the communication interface between the cells and in accordance with the corresponding communication protocol. The acknowledgement may include information related to establishing a connection with the gNB 122B, such as but not limited to, radio resources that may be assigned to the UE 110, radio bearers, RRC configuration messages, etc.

In 440, the gNB 122A sends an RRC connection reconfiguration message to the UE 110. The format and contents of this message is based on the corresponding network protocol. The RRC connection reconfiguration message may include information, such as but not limited to, radio resources to be assigned to the UE 110, radio bearers, cell identities, timers and thresholds related to the network connection, etc.

In 445, the UE 110 sends the gNB 122A an RRC connection reconfiguration complete message. The format and contents of this message is based on the corresponding network protocol. This message indicates to the gNB 122A that the RRC connection reconfiguration has been successfully completed.

Subsequently, the UE 110 may synchronize with the gNB 122B based on information received from the gNB 120A. The UE 110 may then use the gNB 122A for the first portion of the bandwidth being used for communications with the network and the gNB 122B for the second portion of the bandwidth being used for communications with the network. As mentioned above, the exemplary embodiments are not limited to providing the UE 110 with CA as illustrated in the signaling diagram 400. The signaling diagram is merely intended to provide a general overview of how the network may provide the UE 110 with CA. In other exemplary embodiments the UE 110 may be triggered to provide UE capability information without receiving UE capability enquiry message or may be in an RRC inactive state. Thus, the signaling diagram 400 is merely provided for illustrative purposes.

As mentioned above, the signaling diagrams of FIGS. 3 and 4 are general examples of signaling exchanges between the network and the UE 110. These examples are not intended to limit the advertisement of capability information to any particular scenario or context. Other exemplary scenarios during which the advertisement of capability information may occur include, but are not limited to, connecting to a mobile management entity (MME) via an attach procedure, registering with the network, registration update procedure, tracking area update (TAU) procedure, etc.

ENDC and CA relate to the UE 110 being configured with multiple CCs. In ENDC the UE 110 may be configured with at least one cell serving as the MCG for a first RAT and at least one cell serving as the SCG for a second RAT. The MCG may provide a plurality of aggregated CCs and the SCG may provide a plurality of aggregated CCs. In CA, the PCell may provide the PCC and at least one SCell may provide at least one SCC. Each CC may have a particular bandwidth. Thus, the more CCs the more bandwidth available for communications with the network.

Figure 5:
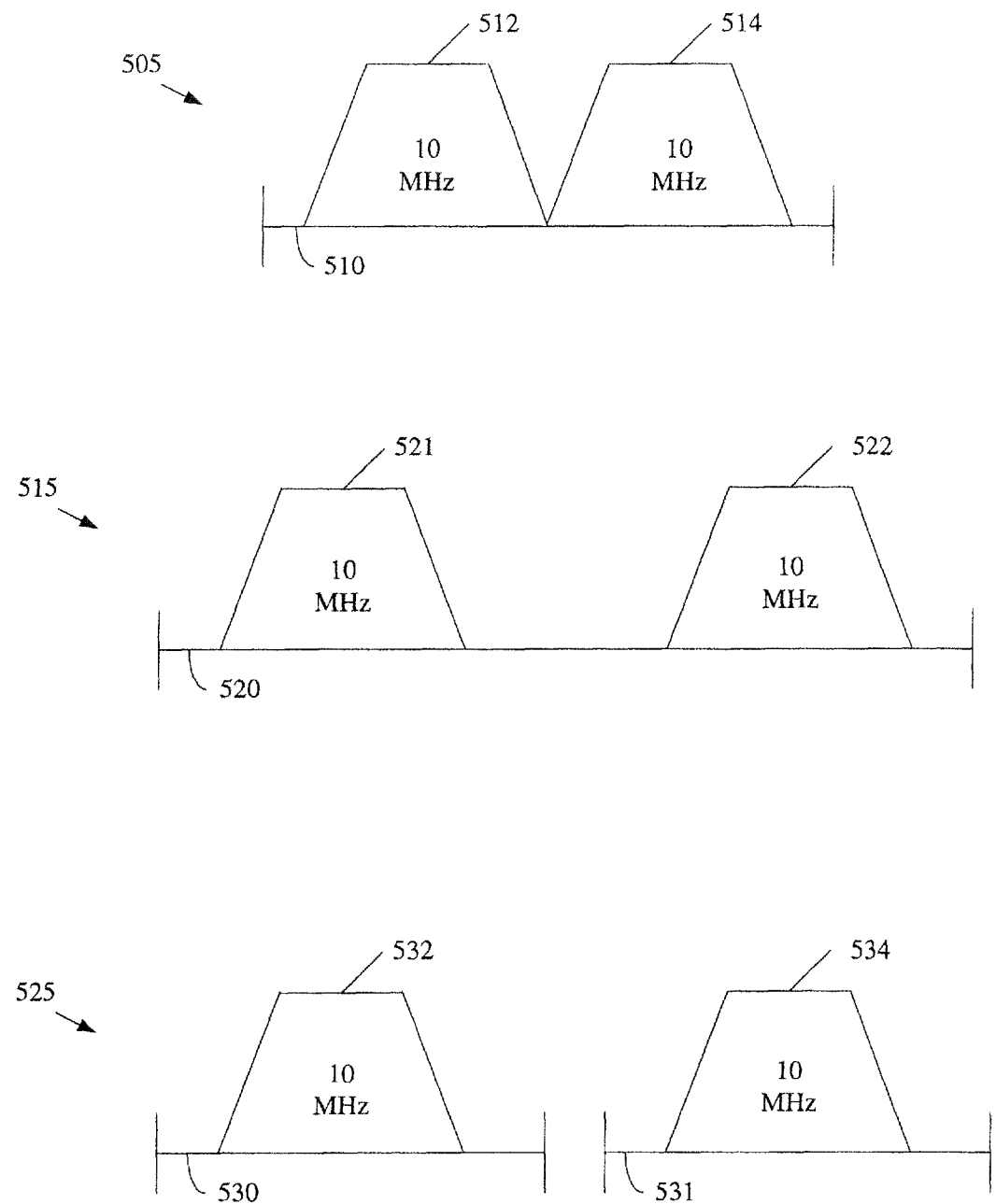
FIG. 5 shows an example of aggregating component carriers according to various exemplary embodiments.

As illustrated in FIG. 5, combination 505 shows two CCs 512, 514 each having a bandwidth of 10 MHz that may be combined for a total bandwidth of 20 MHz. In this example, both CCs operate over the same frequency band 510 and are adjacent to one another. A plurality of CCs that are operating over the same frequency band and are adjacent to one another may be referred to as intra-band contiguous aggregated CCs. Since intra-band contiguous aggregated CCs are adjacent to one another, managing this type of CC may be the least complex and offer the greatest flexibility.

Combination 515 also shows two CCs 522, 524 each having a bandwidth of 10 MHZ that may be combined for a total bandwidth of 20 MHZ. In this example, both CCs operate over the same frequency band 520 but are not adjacent to one another. A plurality of CCs operating over the same frequency band that are not adjacent to one another may be referred to as intra-band non-contiguous aggregated CCs. Managing this type of CC is more complex than managing intra-band contiguous aggregated CCs.

Combination 525 also shows two CCs 532, 534 each having a bandwidth of 10 HZ that may be combined for a total bandwidth of 20 MHz. In this example, the first CC 532 operates over a first frequency band 530 and the second CC 534 operates over a second frequency band 531. A plurality of CCs operating over different frequency bands may be referred to as inter-band CCs. Managing inter-band type of CC is more complex than managing either type intra-band CC.

Those skilled in the art will understand that for either ENDC or CA, a CC may correspond to a bandwidth other than 10 MHZ. For example, other bandwidths may include, but are not limited to, 1.4, 3, 5, 15, 20, 30, 50, 100 MHz. Further, those skilled in the art will understand that the network connection may include CCs of the same type (e.g., intra-band contiguous, intra-band non-contiguous, inter-band) or a combination of different types. The number of CCs may be based on the network protocol. For example, in certain LTE configurations up to five CCs may be aggregated. In other LTE configurations, up to thirty-two CCs may be aggregated. In certain 5G NR, configurations, up to sixteen CCs may be aggregated. However, throughout this description any reference to a particular number of CCs, type of CC, bandwidth or other characteristics is merely provided for illustrative purposes. The exemplary embodiments may apply to prioritizing band combinations that may be used for any number of CCs.

Accordingly, the performance associated with a particular band combination may correlate, at least in part, to the number of LTE CCs and the number of 5G NR CCs included in the band combination. However, CCs may vary in the amount of bandwidth that is provided. Thus, the performance associated with a band combination may also correlate to the total aggregated bandwidth available from the CCs included in the band combination. Further, CCs may also vary in the maximum number of supported layers. For example, a CC that facilitates MIMO communications may support 2, 3, 4, 5, 6, 7 or 8 layers. Generally, the more layers utilized for MIMO communications the higher data rate. Thus, the performance associated with a band combination may also correlate to the number of accumulated layers for the LTE CCs and the number of accumulated layers for the 5G NR CCs included in the band combinations.

The UE 110 may utilize the performance associated with each band combination when prioritizing band combinations that are to be advertised. For instance, the UE 110 may determine one or more performance priority factors associated with each band combination. Throughout this description a performance priority factor associated with a band combination may refer to the number of LTE CCs, the number of 5G NR CCs, the total aggregated bandwidth, the accumulated number of layers for LTE CCs, the accumulated number of layers for 5G NR CCs, or any combination thereof. In some exemplary scenarios, the UE 110 may apply the same weight to each performance priority factor. However, the UE 110 may also differentiate between a plurality of performance priority factors by applying a different weight to all or some the implemented performance priority factors. Based on the implemented one or more performance priority factor and the corresponding weight, the UE 110 may determine that a first band combination has a higher potential peak performance than a second band combination and thus, the UE 110 may prioritize the first band combination over the second band combination.

In addition to the performance priority factors, band combinations may differ with regard to the supported capabilities and/or features. Accordingly, the UE 110 may also utilize supported capabilities and/or features when prioritizing band combinations that are to be advertised. Thus, the UE 110 may increase the likelihood that a band combination that supports a particular capability or feature will be advertised. There are five exemplary MIMO related priority factors described below.

A first MIMO related priority factor may relate to whether a band combination includes a band that is capable of providing a plurality of intra-band CCs that each support multiple input multiple output (MIMO) communications. As mentioned above with regard to FIG. 5, intra-band CCs may be characterized as intra-band contiguous and intra-band non-contiguous and are typically the least complex types of CCs to manage.

To provide an example of the first MIMO related priority factor, consider a first exemplary band combination that includes two bands (Band A and Band B). Band A supports only one CC and the CC of Band A may be capable of MIMO communications. Band B supports intra-band contiguous CCs of two carriers, the first carrier may support MIMO and the second carrier may not support MIMO. Thus, the first exemplary band combination of Band A and Band B does not satisfy the priority factor because although Band B supports intra-band contiguous CCs only one of the intra-band carriers may be capable of MIMO communications. Consider a second exemplary band combination that also includes two bands (Band C and Band D). Band C supports only one CC and the CC may support MIMO communications. Band D supports intra-band contiguous CCs of two carriers, the first carrier may support MIMO communications and the second carrier may also support MIMO communications. Thus, the second exemplary band combination of Band C and Band D satisfies the priority factor because Band D supports intra-band contiguous CCs where both carriers are capable of MIMO communications. Accordingly, in this scenario, the UE 110 would prefer the second exemplary band combination over the first exemplary band combination because the secondary band combination supports intra-band CCs that are each capable of MIMO communications. This example relates to band combinations that may include two bands and three CCs. However, reference to two bands and three CCs is merely provided for illustrative purposes. This MIMO related priority factor may apply to band combinations that include more than two bands and/or more than three carriers.

A second MIMO related priority factor may relate to whether a band combination includes a band that supports gapless measurements and is capable of providing a CC that supports MIMO communications. Gapless measurements may relate to the UE 110 being able to receive information over a frequency band while measurements are being performed. Thus, the UE 110 may prefer gapless measurements because of the corresponding power saving and performance benefits.

To provide an example of the second MIMO related priority factor, consider a first exemplary band combination that includes three bands (Band A, Band B and Band C). Band B and Band C both support gapless measurements. Band A and Band C both support MIMO communications. Thus, in the first exemplary band combination, only Band C supports both gapless measurements and MIMO communications. Consider a second exemplary band combination that also includes three bands (Band D, Band E and Band F). Band E and Band F both support gapless measurements. Band E and Band F also both support MIMO communications. Thus, in this scenario the UE 110 would prioritize the second exemplary band combination over the first exemplary band combination because the second exemplary band combination includes two bands that support both gapless measurements and MIMO communications while the first exemplary band combination only includes one band that supports both gapless measurements and MIMO communications. The example provided above relates to band combinations of three bands and three CCs. However, this example is merely provided for illustrative purposes. This priority factor may apply to band combinations that include any number of bands and/or CCs.

A third MIMO related priority factor may relate to whether a band combination includes a band that supports MIMO communications on the higher order band. To provide an example of the third priority factor, consider a first exemplary band combination that includes two bands (Band A and Band B). Band A supports MIMO communications and Band B does not. A second exemplary band combination also include two bands (Band C and Band D). Band C does not support MIMO communications and Band D does support MIMO communications. Thus, in this example, the UE 110 would prioritize the second exemplary band configuration over the first exemplary band configuration because the second exemplary band configuration supports MIMO communications on the higher order band (e.g., Band D of the combination of Band C and D). The example provided above relates to band combinations of two bands and two CCs. However, this example is merely provided for illustrative purposes. This priority factor may apply to band combinations that include any number of bands and/or CCs.

A fourth MIMO related priority factor may relate to whether a band combination includes a band that supports MIMO communications and a higher order receiver diversity (HORxD). HORxD may relate to MIMO and the number of antennas used for communications. For example, types of MIMO such as, but not limited to, 2×4 MIMO, 4×4 MIMO, 8×8 MIMO, 8×4 MIMO, etc. may each be characterized as corresponding to HORxD. HORxD may provide performance benefits at the UE 110 and cause less impact on network operations.

To provide an example of the fourth MIMO related priority factor, consider a first exemplary band combination that includes two bands (Band A and Band B). Band B supports UL MIMO and HORxD (e.g., 4×4 MIMO, 8×4 MIMO, etc.). A second exemplary band combination also include two bands (Band C and Band D). Band C and Band D both support MIMO but both only employ 2×2 MIMO and thus, do not provide HORxD. Thus, in this example, the UE 110 would prioritize the first exemplary band configuration over the second exemplary band configuration because the first exemplary band configuration supports UL MIMO and HORxD. The example provided above relates to band combinations of two bands and two CCs. However, this example is merely provided for illustrative purposes. This priority factor may apply to band combinations that include any number of bands and/or CCs.

A fifth MIMO related priority factor may relate to whether a band combination includes a band that supports uplink (UL) MIMO communications and a predetermined type of MCS. For example, the predetermined type of MCS may be 256-quadrature amplitude modulation (QAM). Generally, the higher orders of QAM (e.g., 64-QAM, 256-QAM, etc.) may correlate to higher data rates and/or throughput. Thus, the UE 110 may prefer 256-QAM because of the corresponding performance benefits. However, reference to 256-QAM is merely exemplary, other types of MCS may be used by the UE 110 as a priority factor.

To provide an example of the fifth MIMO related priority factor, consider a first exemplary band combination that includes two bands (Band A and Band B). Band B supports UL MIMO and 256-QAM. A second exemplary band combination also include two bands (Band C and Band D). Band C and Band D both support UL MIMO but neither provide 256-QAM. Thus, in this example, the UE 110 would prioritize the first exemplary band configuration over the second exemplary band configuration because the first exemplary band configuration supports UL MIMO and 256-QAM. In a scenario where a first band combination and a second band combination both include a band that supports UL MIMO and 256-QAM, the UE 110 may prioritize the band combination with 256-QAM on the higher order band. Thus, with regard to the first and second exemplary band combinations mentioned above, if Band A of the first exemplary band combination and Band D of the second exemplary band configuration both support UL MIMO and 256-QAM the UE 110 may prioritize the second exemplary band combination over the first exemplary band combination because the second exemplary band combination has UL MIMO and 256-QAM on the higher order band. The example provided above relates to band combinations of two bands and two CCs. However, this is merely provided for illustrative purposes. This priority factor may apply to band combinations that include any number of bands and/or CCs.

In some exemplary scenarios, the UE 110 may apply the same weight to each MIMO related priority factor. However, the UE 110 may also differentiate between a plurality of priority factors by applying a different weight to all or some of the implemented priority factors. In one example, the UE 110 may assign a higher weight to MIMO related priority factors associated with downlink communications compared to MIMO related priority factors related to uplink communications. In another example, if the UE 110 were to implement the five MIMO related priority factors mentioned above, the first MIMO related priority factor may be assigned the greatest weight, the second MIMO related priority factor may be assigned the second greatest weight, the third MIMO related priority factor may be assigned the third greatest weight, the fourth MIMO related priority factor may be assigned the fourth greatest weight and the fifth MIMO related priority factor may be assigned the least weight. Thus, when generating the priority order in this example, if a first band combination includes the first and second priority factors and a second band combinations includes the third and fourth priority factors, the UE 110 would include the first band combination before the second band combination in the priority order. Thus, in this example while both bands may correspond to two priority factors, the weight of the first and second priority factor distinguish the first band combination from the second band combination. In a second exemplary configuration the second priority factor may be assigned the greatest weight, the third priority factor may be assigned the second greatest weight, the first priority factor may be assigned the third greatest weight, the fifth priority factor may be assigned the fourth greatest weight and the fourth priority factor may be assigned the least weight. However, the exemplary embodiments are not limited to these examples and may apply any weight to any implemented priority factor.

The UE 110 may also utilize ENDC related priority factors when prioritizing band combinations that are to be advertised. A first ENDC related priority factor relates to whether a band combination supports dynamic power sharing. For example, the UE 110 may be capable of a maximum transmit power. Dynamic power sharing refers to a dual transmission scenario where the UE 110 may unequally distribute transmission power by utilizing a first transmit power for communications over one RAT (e.g., LTE, 5G NR) and a second transmit power for communication over the other RAT. The combined first transmit power and the second transmit power are equal to or less than the maximum transmit power. Dynamic power sharing is in contrast to an equal power sharing scheme where the UE 110 utilizes the same transmit power for both RATs. Thus, the UE 110 may utilize this priority factor to increase the likelihood that a band combination that supports dynamic power sharing is advertised.

A second ENDC related priority factor relates to whether a band combination supports dual power amplifying. Dual Band Power Architecture enables the UE 110 to switch between two different frequency bands. Instead of utilizing a separate power amplifier for each band, the UE 110 may utilize a dual band power amplifier for communications over an intra-band combination that supports dual power amplifying. Accordingly, the UE 110 may utilize this priority factor to ensure a band combination that supports dual power amplifying is advertised.

A third ENDC related priority factor relates to whether a band combination includes a band from frequency range 1 (FR1) or frequency range 2 (FR2). For instance, frequency bands for 5G NR may be separated into FR1 and FR2. FR1 includes sub-6 GHz bands, some of which are also used by LTE. FR2 may include frequency bands within the millimeter wave (mmWave) range (e.g., approximately 24 GHz to 53 GHz). Bands from FR1 may support LTE and 5G NR uplink sharing via time division multiplexing (TDM) only, frequency division multiplexing (FDM) only or both. Further, bands from FR1 may support LTE and 5G NR uplink switching. Thus, the UE 110 may prefer to prioritize band combinations that include FR1 bands because the FR1 bands may support capabilities such as uplink sharing and uplink switching among LTE and 5G NR.

The UE 110 may also utilize an IMS related priority factor when prioritizing band combinations that are to be advertised. The IMS related priority factor may be related to whether the band combination supports IMS voice services. For example, in 5G NR, IMS voice services may not be supported by every frequency band. Thus, the UE 110 may utilize this priority factor to increase the likelihood that a band combination includes a band that supports IMS voice services is advertised.

The performance priority factors, MIMO related priority factors, ENDC related priority factors and IMS related priority factor are merely provided for illustrative purposes. Different entities may refer to similar concepts by different names and the exemplary embodiments may apply to any number of priority factors that correspond to any particular characteristic.

Figure 6:
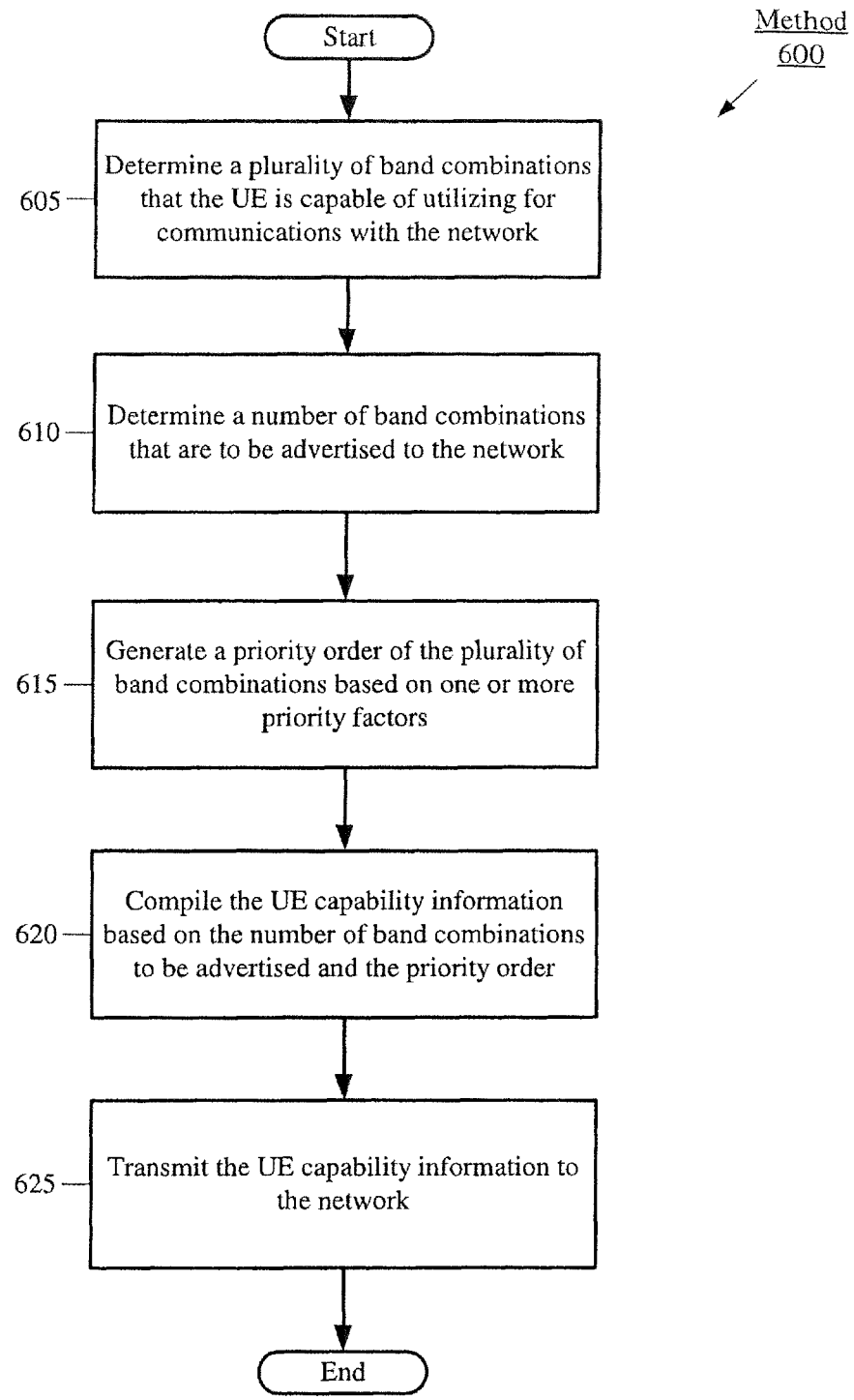
FIG. 6 shows a method for prioritizing band combinations that are to be advertised according to various exemplary embodiments.

FIG. 6 shows a method 600 for prioritizing band combinations that are to be advertised according to various exemplary embodiments. The method 600 will be described with regard to the UE 110, the network arrangement 100, the signaling diagram 300 and the signaling diagram 400.

Consider the following exemplary scenario, the UE 110 is camped on a cell of a corresponding RAT. The UE 110 is in RRC connected state and has been triggered to provide the network with UE capability information.

In 605, the UE 110 may determine a plurality of band combinations that the UE 110 is capable of utilizing for communications with the network. For example, the UE 110 may determine that a plurality of band combinations may be used for ENDC and/or CA. If the UE 110 is operating in NSA mode for 5G, the UE 110 may determine band combinations that may be used for CA on LTE, CA on 5G NR and/or ENDC. If the UE 110 is operating in SA mode for 5G, the UE 110 may determine band combinations that may be used for CA on 5G NR.

During operation, the UE 110 may determine band combinations by tuning its transceiver 225 to various frequency bands and processing information received on each frequency band. Subsequently, the UE 110 may determine which band combinations may be supported by the UE 110 based on various factors, including but not limited to, measurement data corresponding to particular frequency bands, identifying a particular type of signal or bit transmitted over a particular frequency band, stored data indicating which frequency bands the UE 110 has previously used for communications with the network, etc.

The UE 110 may also be able to determine the performance, capabilities and/or features that the band combinations may support by processing information received over a frequency band or receiving a message from the network. For example, the UE 110 may receive information elements (IEs) that may indicate a band is capable of providing a particular downlink bandwidth, a particular uplink bandwidth, a maximum number of MIMO layers for physical downlink shared channel (PDSCH), a maximum number of MIMO layers for physical uplink shared channel (PUSCH), dynamic power sharing, IMS voice services, etc. A person of ordinary skill of the art would understand that there are various ways to determine which band combinations the UE 110 may utilize for communications with the network and the capabilities or features that a band combination may support. The exemplary embodiments may apply to a plurality of band combinations that are determined in any appropriate manner.

In 610, the UE 110 determines a number of band combinations that are to be advertised to the network. As mentioned above, the UE may be limited in the number of band combinations that can be advertised for any of a variety of different reasons. In this example, the UE 110 determines that the standard-based maximum number of band combinations is 128 entries. Thus, the UE 110 determines that there are at most 128 band combinations that may be indicated in the UE capability information at this time.

In 615, the UE 110 generates a priority order of the plurality of band combinations based on one or more priority factors. To provide an example, the UE 110 may determine a performance priority factor (e.g., bandwidth, number of CCs, number of layers, combination thereof, etc.) for each band combination and then generate the priority order of the plurality of band combinations based on each band combinations corresponding performance priority factor.

In another example, the UE 110 may generate the priority order based on whether each band combination supports one or more of the MIMO related priority factors. For instance, if the UE 110 determines that a first band combination possess a MIMO related priority factor and a second band combination does not possess the MIMO related priority factor, the UE 110 would prefer the network to use the first band combination because it possesses a particular characteristic, e.g., the preferred MIMO related priority factor. This enables the UE 110 to organize the plurality of band combinations into an order that indicates the preferred band combination for the UE 110. In another example, the UE 110 may generate the priority order based on any combination of (i) one or more performance priority factor, (ii) one or more MIMO related priority factor, (iii) one or more ENDC related priority factor and (iv) the IMS related priority factor. However, reference to a priority order is merely for illustrative purposes. The UE 110 may indicate which band combinations the UE 110 prefers based on any prioritized format or by associating any type of indication with the advertised band combinations.

Further, in some exemplary embodiments, the UE 110 may utilize a first set of priority factors to generate the prioritized order at a first time and a second set of priority factors, different than the first set of priority factors, to generate the prioritized order at a second time. The UE 110 may select the set of priority factors to be used dynamically based on aspects such as, but not limited to, the type of uplink or downlink communication to be performed (e.g., data, voice, etc.), the location of the UE 110 and any information related to previous instances in which the UE 110 was operating within this location, the network environment, the carrier, an indication from the network, etc. These aspects are merely provided for illustrative purposes, the UE 110 may implement priority factors to utilize for generating a prioritized order of band combinations for any appropriate reason.

Consider the following exemplary scenario, the UE 110 determines that there are 200 available band combinations in 605 and determines that are 128 band combinations to be advertised in 610. The UE 110 may then evaluate each of the 200 band combinations for one or more priority factors. This may enable the UE 110 compile the 200 band combinations into a priority order that indicates which band combinations possess the characteristics the UE 110 would prefer to be included in the network connection. Accordingly, in this example, when the UE capability information is generated as described below in 620, the UE may determine the 128 band combinations out of the 200 available band combinations in the order of preference and then include the preferred 128 band combinations in the UE capability information. However, reference to 128 band combinations out of 200 band combinations is merely exemplary. The exemplary embodiments may apply to any plurality of available band combinations and any number of band combinations that are to be advertised.

In one example, the UE 110 may apply the same weight to priority factors. However, the UE 110 may also differentiate between priority factors by applying a different weight to all or some the priority factors. Further, the UE 110 may also implement a multi-step process. This may include generating an initial priority order based on one or more priority factor and then if any of the band combinations are determined to have the same priority, the UE 110 may then utilize a second one or more priority factor to adjust the initial priority order. For example, the UE 110 may initially evaluate the plurality of band combinations based on their corresponding performance priority factor. This may generate a prioritized list of band combinations. However, within the prioritized list a first band combination and a second band combination have the same priority based on the implemented performance priority factor. To differentiate between the two band combinations, the UE 110 may evaluate these band combinations to determine whether any of the MIMO-related priority factors are present. However, the exemplary embodiments are not limited to these examples and may evaluate band combinations using any priority factor in any appropriate manner.

In some exemplary embodiments, the UE 110 may prioritize band combinations with similar characteristics based on selecting a downlink MIMO variant. For example, a band combination may include a first band with 4 layers, a second band with 4 layers and a third band with 4 layers. However, the UE 110 may be only be capable of utilizing 10 accumulated layers on the downlink. Thus, the UE 110 would not be able to advertise a band combination that includes the first band with 4 layers, the second band with 4 layers and a third band with 4 layers because the 12 accumulated layers of this combination exceeds the number of layers (e.g., 10) the UE 110 is capable of utilizing. As a result, the UE 110 may advertise different MIMO variants of the band combination that are limited to 10 layers, e.g., (i) a first band combination that includes the first band with 2 layers, the second band with 4 layers and the third band with 4 layers, (ii) a second band combination that includes the first band with 4 layers, the second band with 2 layers and the third band with 4 layers and (iii) a third band combination that includes the first band with 4 layers, the second band with 4 layers and the third band with 2 layers. Instead of advertising all three band combinations, e.g., (i)-(iii), the UE 110 may select one MIMO variant for advertising. The selection of the MIMO variant may be based on any of a plurality of different factors, such as which one of the three bands is to be advertised with 4 layers, an acquisition database, any of the exemplary priority factors, a location specific database maintained by the network (e.g., a database of cells that are fetched based on the location of the UE), etc.

In 620, the UE 110 compiles the UE capability information based on the number of band combinations that are to be advertised to the network and the priority order. Thus, the UE capability information includes an indication of band combinations that the UE 110 has determined possess characteristics that the UE 110 would prefer to be used for the network connection. The capability information may reference a band combination in any of a plurality of different ways including, but not limited to, a particular frequency band ID, the corresponding frequency range, an indication of the CCs that may be used, the set of features the bands support, the cell that is to provide a CC over the band, the bandwidth, etc.

In 625, the UE 110 transmits the UE capability information to the network. Subsequently, the network may configure the UE 110 with ENDC and/or CA by assigning the UE 110 radio resources over one of the advertised band combinations.

In some exemplary scenarios, the network may provide the UE 110 with a radio frequency band list that includes a plurality of frequency bands that the network may utilize for communications over a particular RAT. The UE 110 may utilize this radio frequency band list to generate the prioritized list of band combinations.

Figure 7:
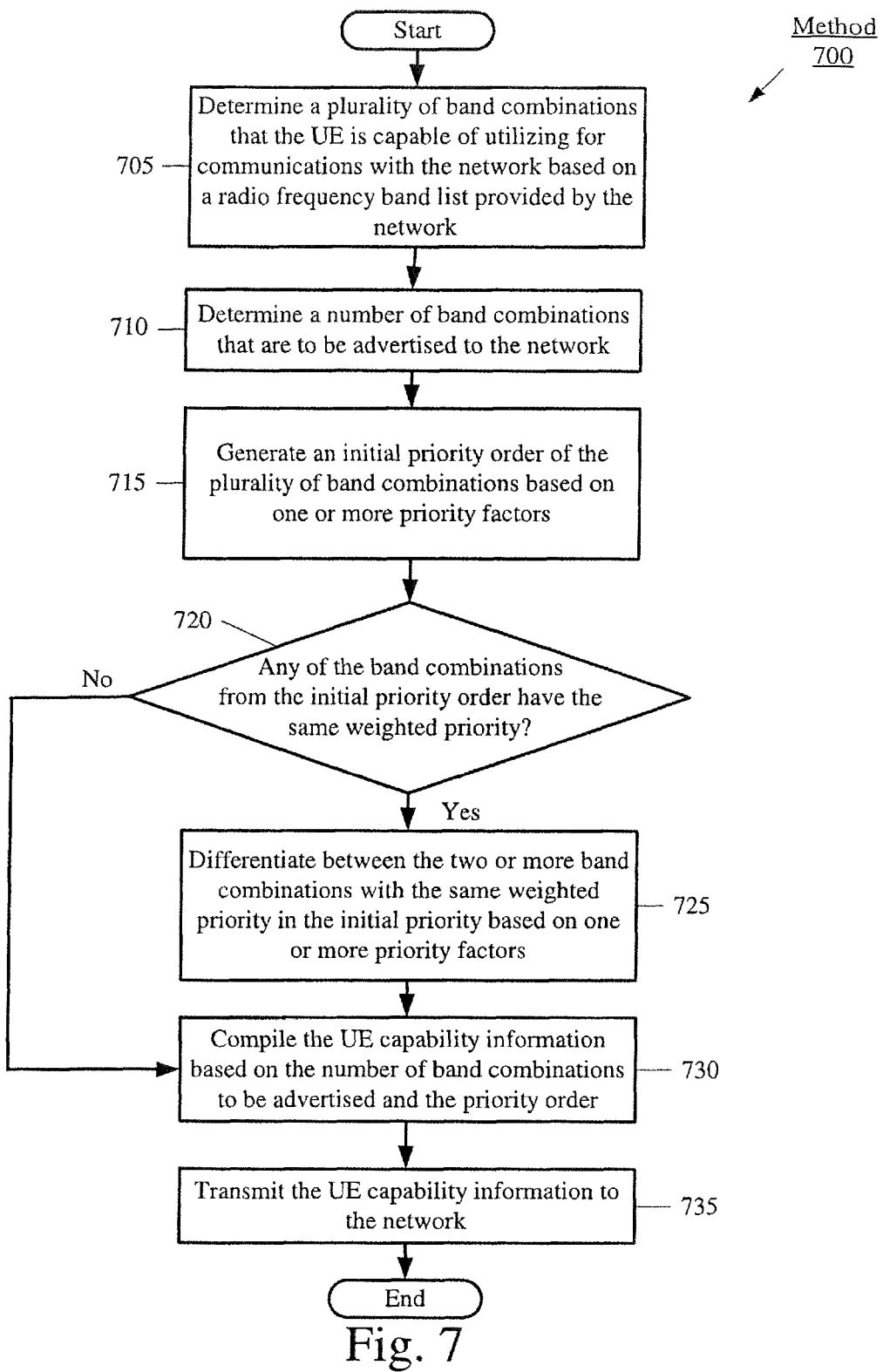
FIG. 7 shows a method for prioritizing band combinations that are to be advertised using a radio frequency band list provided by the network according to various exemplary embodiments.

FIG. 7 shows a method 700 for prioritizing band combinations that are to be advertised using a radio frequency band list provided by the network according to various exemplary embodiments. The method 700 will be described with regard to the UE 110, the network arrangement 100, the signaling diagram 300 and the signaling diagram 400.

Consider the following exemplary scenario, the UE 110 is camped on a cell of a corresponding RAT. The UE 110 is in RRC connected state and has been triggered to provide the network with UE capability information.

In 705, the UE 110 determines a plurality of band combinations the UE 110 is capable of utilizing for communications with the network based on the radio frequency band list provided by the network.

In some scenarios, the network may provide the UE 110 with a radio frequency band list for LTE and a radio frequency band list for 5G NR. For example, a first radio frequency band list may be for LTE and may include band 1, band 2, band 3, band 4, and band 5 and a second radio frequency band list may be for 5G NR and may include band n1, n2, n3, n4 and n5. Each frequency band list may include an indication of priority. For example, the bands may be ordered according to their priority such that band 1 has a higher priority than bands 2-5 and band n1 has a higher priority than bands n2-n5. Thus, the UE 110 may determine a plurality of band combinations for CA and/or ENDC using the bands from the first frequency band list and the bands from the second frequency band list. The exemplary embodiments are not limited to a radio frequency band list that includes the number or particular bands referenced above. The exemplary embodiments may apply to a frequency band list that includes any number of frequency bands and any frequency band from associated with either LTE or 5G NR. Further, the exemplary embodiments are not limited to a radio frequency band list that is ordered by the network to indicate which bands the network would prefer to the UE 110 to utilize. The exemplary embodiments may apply to the network providing information regarding which frequency bands may be utilized in any appropriate format and the network may indicate preference in any appropriate manner.

In some scenarios, the network may only provide a radio frequency band list for one of the RATs, e.g., LTE or 5G NR. For example, the UE 110 may register with the network while on the LTE RAT and receive the radio frequency band list for LTE that provides an indication of the LTE bands that the UE 110 may utilize for communications. During operation, the UE 110 may transition to the 5G NR RAT and perform a registration update. However, when the network sends the UE 110 the capability enquiry message it does not include the radio frequency band list for the 5G NR RAT. In this type of scenario, the UE 110 may utilize the information from the radio frequency band list for LTE to determine the frequency bands for both LTE and 5G NR. For example, FR1 for 5G NR overlaps with the LTE spectrum. Thus, the UE 110 may identify that an LTE band (e.g., band 12) was included in the frequency band list and map the LTE band to its spectrum equivalent in 5G NR (e.g., band n12). Similarly, if the UE 110 only has a frequency band list for 5G NR, it may identify that a 5G NR band (e.g., band n12) was included in the frequency band list and map the 5G NR band to its spectrum equivalent in LTE (e.g., band 12).

In 710, the UE 110 determines a number of band combinations that are to be advertised to the network. This is similar to 610 of the method 600.

In 715, the UE 110 generates an initial priority order of the plurality of band combinations based on the priority indicated in the radio frequency band list. For example, consider an exemplary scenario in which the network provides a first radio frequency band list for LTE that includes band 1, band 2 and band 3. The network also provides a second radio frequency band list for 5G NR that includes band n1, band n2 and band n3. As mentioned above, the network may indicate which bands the network would prefer the UE 110 to utilize based on the order of the bands in each respective radio frequency band list. The UE 110 may generate the priority order for the band combinations based on applying a weight to each of the bands in a band combination. The weight for each band may be based on the priority indicated by the network within the respective frequency band lists. For example, both band 1 and band n1 are assigned the highest priority by the UE 110, band 2 and band n2 are assigned the second highest priority by the UE 110 and band 3 and band n3 are assigned the lowest priority by the UE 110. Thus, in this example, the first entry in the LTE radio frequency band list (e.g., band 1) has the same priority as the first entry in the 5G NR radio frequency band list (e.g., band n1). The UE 110 may generate the priority order of the plurality of band combinations based on the cumulated weighted priority for each band combination. In some exemplary scenarios, the UE 110 may also consider the priority factors (e.g., performance priority, MIMO related priority, ENDC related priority, etc.) when generating the initial priority order of the plurality of the band combinations.

In 720, the UE 110 determines whether any of the band combinations from the initial priority order have the same weighted priority. If none of the band combinations from the initial priority order have the same weighted priority the method 700 continues to 730. If two or more band combinations have the same weighted priority the method 700 continues to 725.

In 725, the UE 110 adjusts the priority of the two or more band combinations with the same weighted priority in the initial priority order by evaluating each of the two or more band combinations for one or more priority factors. For instance, in one example, the UE 110 may determine a performance priority factor for each of the two or more band combinations and then generates an adjusted priority order. The UE 110 may also evaluate each band combination for any of the MIMO related priority factors, ENDC related priority factors or IMS priority factor mentioned above. Accordingly, 715-720 show a multi-step evaluation process with a first step that includes determining an initial priority order of the plurality of band combinations based on the priority indicated in the radio frequency band lists and a second step that includes adjusting the priority order based on one or more priority factors.

In 730, the UE 110 compiles the UE capability information based on the number of band combinations that are to be advertised to the network and the priority order. This is similar to 620 of the method 600. However, in this example the priority order may be either the initial priority order or the adjusted priority order depending on whether two or more band combinations have the same weighted priority in 720.

In 735, the UE 110 transmits the UE capability information to the network. Subsequently, the network may configure the UE 110 with ENDC and/or CA by assigning the UE 110 radio resources over one of the advertised band combinations.

The UE 110 may also consider whether a band combination supports supplementary uplink when prioritizing band combinations that are to be advertised. The supplementary uplink generally refers to a frequency band that is configured by a cell to improve uplink coverage and is different than the frequency band typically used by the cell for uplink communications. Supplementary uplink may be supported in NSA mode and SA mode.

Figure 8:
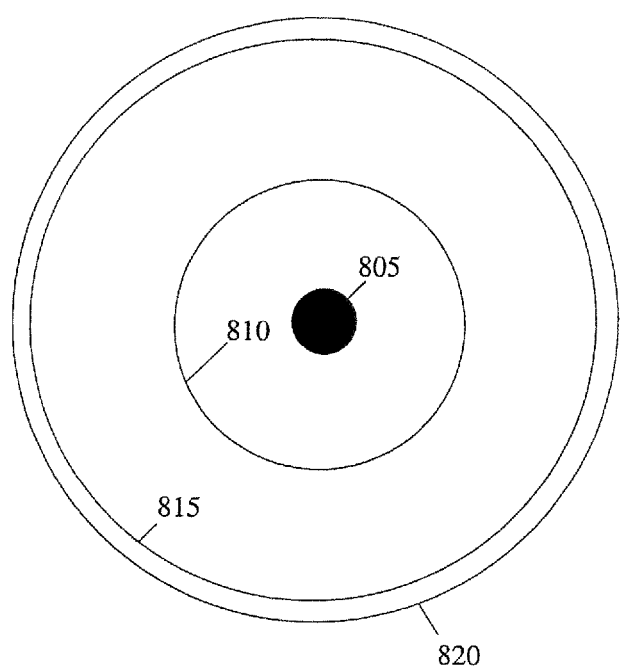
FIG. 8 shows an example of supplementary uplink coverage according to various exemplary embodiments.

FIG. 8 shows an example of supplementary uplink coverage. The cell 805 has a first coverage area 810 that may support both downlink and uplink communications over a first frequency band. The cell 805 also has a second coverage area 815. Typically, cell coverage for the uplink direction is lower than downlink direction because the transmit power for the UE 110 is not as high as the transmit power for the cell 805. Thus, in this example, the second coverage area 815 supports downlink communications over the first frequency band. The cell 805 also has a third coverage area 820. The third coverage area 820 is the supplementary uplink coverage. Thus, the cell 805 may be configured with a supplementary uplink band to extend the cell's 805 coverage for uplink communications. FIG. 8 is not intended to indicate that downlink coverage, uplink coverage or supplementary uplink coverage are a certain size or proportion relative to one another. FIG. 8 is merely provided to demonstrate that supplementary uplink may extend cell coverage for uplink communications.

Figure 9:
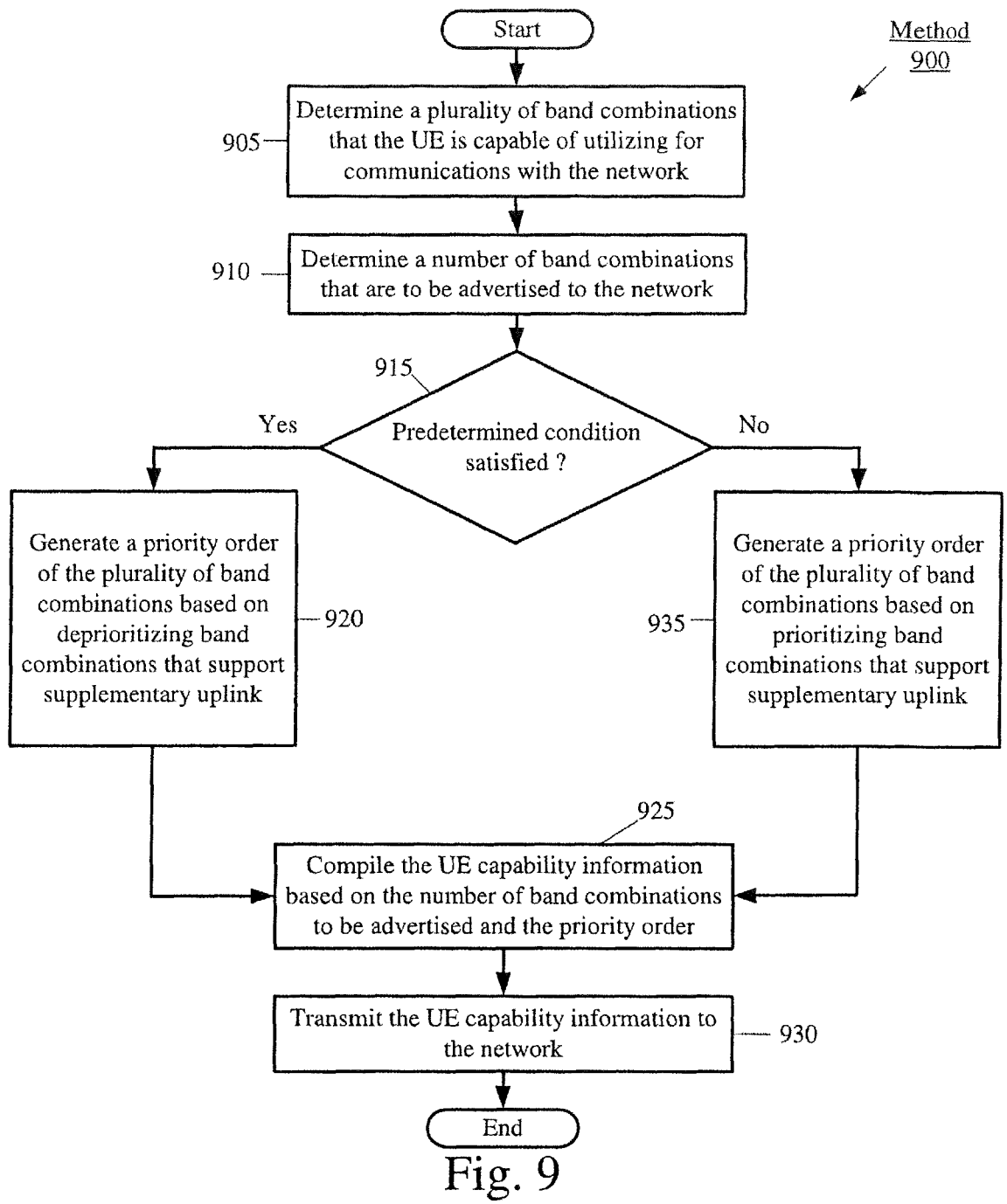
FIG. 9 shows a method for prioritizing band combinations that support supplementary uplink according to various exemplary embodiments.

FIG. 9 shows a method 900 for prioritizing band combinations that support supplementary uplink according to various exemplary embodiments. The method 900 will be described with regard to the UE 110, the network arrangement 100, the method 600 and the method 700.

In 905, the UE 110 determines a plurality of band combinations the UE 110 is capable of utilizing for communications with the network based on the radio frequency band list provided by the network. 905 may be similar to either 605 of the method 600 or 705 of the method 700.

In 910, the UE 110 determines a number of band combinations that are to be advertised to the network. This is similar to 610 of the method 600.

In 915, the UE 110 determines whether a predetermined condition is satisfied. The predetermined condition may indicate to the UE 110 whether utilizing supplementary uplink would improve performance. As indicated above with reference to FIG. 8, supplementary uplink may be redundant in some areas. Since supplementary uplink does not improve performance in all scenarios, the UE 110 may prefer to prioritize band combinations that support supplementary uplink when conditions indicate that supplementary uplink may improve performance and deprioritize or even remove band combinations that support supplementary uplink when conditions indicate that supplementary uplink may not improve performance. If the predetermined condition is satisfied in 915, the method 900 continues to 920. If the predetermined condition is not satisfied in 915, the method 900 continues to 935.

In some exemplary embodiments, the predetermined condition may be based on RF conditions experienced by the UE 110. For example, if the reference signal received power (RSRP) is greater than a predetermined threshold (e.g., −50 decibel-milliwatt (dBm), −100 dBm, −110 dBm, −150 dBm, etc.) this may indicate that supplementary uplink may not improve performance. Reference to any particular RF metric or any particular value for the corresponding predetermined threshold is only provided for illustrative purposes. The exemplary embodiments may utilize any appropriate indication related to RF conditions when determining whether supplementary uplink would improve performance.

In some exemplary embodiments, the predetermined condition may be based on transmit power. For example, if the transmit power is greater than a predetermined threshold, (e.g., 10 decibels (dB), 15 dB, 17 dB, 19 dB, 21 dB, 25 dB etc.) this may indicate that supplementary uplink may not improve performance. Reference to transmit or any particular value for the corresponding predetermined threshold is only provided for illustrative purposes. The exemplary embodiments may utilize any appropriate indication related to the UE 110 ability to successfully deliver a signal to a cell, when determining whether supplementary uplink would improve performance.

In some exemplary embodiments, the predetermined condition may be based on the geographic location of the UE 110. For example, if the UE 110 is located within a geographic location that is associated with uplink limited conditions this may indicate that supplementary uplink may improve performance. The geographic location may be identified based on information received from the network, a determination made by the UE 110 based on operating within the geographic location or other characteristics of the geographic location. To provide an example, if the UE 110 is within a predetermined distance to a location such as a body of water, a mountain or an airport this may indicate to the UE 110 that uplink cell coverage may be limited and thus, supplementary uplink may improve performance.

In 920, the UE 110 generates a priority order based on deprioritizing band combinations that support supplementary uplink. For instance, the UE 110 may determine that supplementary uplink would likely not improve performance. With regard to the above examples, this may occur when the RF conditions are greater than the predetermined threshold, transmit power is greater than the predetermined threshold and/or the UE 110 is outside of a geographic location that is associated with an uplink limited condition. The UE 110 may generate the prioritized order based on only supplementary uplink or may combine supplementary uplink consideration with any other priority factor. For example, with regard to the method 600, 915-920 may be incorporated into 615. With regard to the method 700, 915-920 may be incorporated into 715 and/or 725.

In 925, the UE 110 compiles the UE capability information based on the number of band combinations that are to be advertised to the network and the priority order.

In 930, the UE 110 transmits the UE capability information to the network. Subsequently, the network may configure the UE 110 with ENDC and/or CA by assigning the UE 110 radio resources over one of the advertised band combinations.

Returning to 915, if the predetermined condition is not satisfied in 915 and the method 900 continues to 935. In 935, the UE 110 generates a priority order based on prioritizing band combinations that support supplementary uplink. For instance, the UE 110 may determine that supplementary uplink would likely improve performance. With regard to the above examples, this may occur when the RF conditions are less than the predetermined threshold, transmit power is less than the predetermined threshold and/or the UE 110 is within a geographic location that is associated with an uplink limited conditions. With regard to the method 600, 915-935 may be incorporated into 615. With regard to the method 700, 915-935 may be incorporated into 715 and/or 725. Subsequently, the method 700 continues to 925.

The exemplary embodiments describe various mechanisms related to advertising band combinations. These mechanisms may be used in conjunction with currently implemented band combination advertising methods, future implementations of band combination advertising methods or independently from other band combination advertising methods. The exemplary embodiments may apply to any scenario where the UE 110 is configured to advertise a plurality of band combinations to the network.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a user equipment (UE):
   receiving a request from a network for radio access capabilities of the UE;
   determining a first plurality of band combinations that the UE is capable of utilizing for communications with the network;
   determining a number of band combinations that are to be included with a message generated in response to the request;
   ordering the plurality of band combinations into a prioritized order of band combinations based on at least two weighted priority factors, wherein the at least two weighted priority factors are (i) weighted differently and (ii) applied to each band combination of the plurality of band combinations;
   generating the message that includes the radio access capabilities, wherein the message includes a second plurality of band combinations that are based on the prioritized order and the number of band combinations that are to be included with a message; and
   transmitting the message to the network.

2. The method of claim 1, where ordering the plurality of band combinations is further based on whether each of the plurality of band combination supports supplementary uplink.

3. The method of claim 2, further comprising:
   determining whether a predetermined condition is satisfied,
   wherein when one or more band combinations support supplementary uplink and the predetermined condition is satisfied, the one or more band combinations are deprioritized, and
   wherein when the one or more band combinations support supplementary uplink and the predetermined condition is not satisfied, the one or more band combinations are prioritized.

4. The method of claim 1, wherein the at least two priority factors comprise two of a performance priority factor, a multiple input multiple output (MIMO) related priority factor, an LTE-NR dual-connectivity (ENDC) related priority factor or an internet protocol (IP) multimedia subsystem (IMS) priority factor.

5. The method of claim 4, wherein the MIMO related priority factor comprises whether a band combination includes a band that supports intra-band component carriers and multiple input multiple output (MIMO) communication.

6. The method of claim 4, wherein the MIMO related priority factor comprises whether a band combination includes a band that supports gapless measurements and multiple input multiple output (MIMO) communication.

7. The method of claim 4, wherein the MIMO related priority factor comprises whether a band combination includes a band that supports uplink (UL) multiple input multiple output (MIMO) communication and 256 quadrature amplitude (256-QAM).

8. The method of claim 4, wherein the MIMO related priority factor comprises whether a band combination includes a band that supports higher order receiver diversity (HORxD) and multiple input multiple output (MIMO) communication.

9. The method of claim 4, wherein the MIMO related priority factor comprises whether a band combination includes a band combination that supports multiple input multiple output (MIMO) communication on a higher order band.

10. The method of claim 4, wherein the ENDC related priority factor comprises whether a band combination includes a band combination that supports dynamic power sharing.

11. The method of claim 4, wherein the ENDC related priority factor comprises whether a band combination includes a band combination that supports dual power amplifying.

12. The method of claim 4, wherein the ENDC related priority factor comprises whether a band combination includes a band within frequency range 1 (FR1).

13. A user equipment (UE), comprising:
   a transceiver configured to connect to a network; and
   a processor configured to:
   receive a request from the network for radio access capabilities of the UE;
   determine a first plurality of band combinations that the UE is capable of utilizing for communications with the network;
   determine a number of band combinations that are to be included with a message generated in response to the request;

order the plurality of band combinations into a prioritized order of band combinations based on at least two priority factors, wherein the at least two weighted priority factors are (i) weighted differently and (ii) applied to each band combination of the plurality of band combinations, wherein the at least two priority factors are evaluated by the UE; and generate the message that includes the radio access capabilities, wherein the message includes a second plurality of band combinations that are based on the prioritized order and the number of band combinations that are to be included with a message, wherein the transceiver is further configured to transmit the message to the network.

14. The UE of claim 13, where ordering the plurality of band combinations is further based on whether each of the plurality of band combination supports supplementary uplink.

15. The UE of claim 14, further comprising:
determining whether a predetermined condition is satisfied,
wherein when one or more band combinations support supplementary uplink and the predetermined condition is satisfied, the one or more band combinations are deprioritized, and
wherein when the one or more band combinations support supplementary uplink and the predetermined condition is not satisfied, the one or more band combinations are prioritized.

16. The UE of claim 13, wherein the at least two priority factors comprises two of a performance priority factor, a multiple input multiple output (MIMO) related priority factor, an LTE-NR dual-connectivity (ENDC) related priority factor or an internet protocol (IP) multimedia subsystem (IMS) priority factor.

17. A method, comprising:
at a user equipment (UE):
receiving a request from a network for radio access capabilities of the UE;
determining a first plurality of band combinations that the UE is capable of utilizing for communications with the network based on a radio frequency band list;
ordering the plurality of band combinations into a prioritized order of band combinations based on the radio frequency band list, wherein the prioritized order of band combinations is based on at least two weighted priority factors wherein the at least two weighted priority factors are (i) weighted differently and (ii) applied to each band combination of the plurality of band combinations, wherein the at least two weighted priority factors include two or more of a number of Long-Term Evolution (LTE) component carriers (CCs), a number of 5G New Radio (NR) CCs, a total aggregated bandwidth, an accumulated number of layers for LTE CCs, an accumulated number of layers for 5G NR CCs, or any combination thereof, and wherein the ordering of the plurality of band combinations comprises determining, based on the least two weighted priority factors and their respective weights, that a first band combination has a higher potential peak performance than a second band combination and prioritizing the first band combination over the second band combination in the prioritized order of band combinations;
generating a message that includes the radio access capabilities, wherein the message includes the prioritized order of band combinations; and
transmitting the message to the network.

18. The method of claim 17, further comprising:
determining whether any two or more of the plurality of band combinations have a same priority.

19. The method of claim 18, further comprising:
when two or more of the plurality of band combinations have the same priority, determining a further priority for each of the two or more of the plurality of band combinations having the same priority based on the priority factors; and
reordering the two or more of the plurality of band combinations in the prioritized order of band combinations based on the further priority.

20. The method of claim 19, wherein the priority factors comprises two of a performance priority factor, a multiple input multiple output (MIMO) related priority factor, an LTE-NR dual-connectivity (ENDC) related priority factor or an internet protocol (IP) multimedia subsystem (IMS) priority factor.

* * * * *